May 6, 1958 W. H. MARTY 2,833,848
FLAT DRY CELL BATTERY
Filed March 23, 1955

INVENTOR
WILBERT H. MARTY

By John L. Diehl
Attorney

United States Patent Office 2,833,848
Patented May 6, 1958

2,833,848

FLAT DRY CELL BATTERY

Wilbert Henry Marty, Madison, Wis.

Application March 23, 1955, Serial No. 496,248

10 Claims. (Cl. 136—111)

This invention relates to a flat dry cell battery and more particularly to such a battery of cylindrical form consisting of a stack of cylindrical cells contained in a synthetic resin tube.

The cells of a Zamboni pile have been assembled within a tube of polymethyl methacrylate or the like and stacks of cells, each individually sealed, have been enclosed within and held together by tubes of cellulosic material shrunk into place. Similarly it is well known to provide a jacket for a battery or a cell such as a flat cell battery or a cylindrical primary dry cell by shrinking a tube of cellulosic material therearound. However, it has been impractical heretofore to provide a single member which at the same time seals the cells, holds them together both longitudinally and sidewise and provides a jacket and additionally provides a construction extremely resistant to leakage.

Heretofore jackets for batteries or cells which were shrunk therearound and comprised of cellulosic or synthetic resins have not successfully prevented leakage and shortage. The construction of our invention is different in many respects from constructions heretofore proposed and successfully prevents leakage, shorting and swelling of a battery made in accordance therewith, thus providing a battery which is substantially free from a tendency to damage any apparatus in which it is installed. The adhesive sealing and the heat sealing of the cathodic elements of the cells to the jacket, the provision of a seal between a cathode comprising a conductive polymer and the jacket and the provision of upturned edges on the cathodic element all contribute to the invention and its success.

It is therefore an object of the invention to provide a cylindrical dry battery consisting of a plurality of circular flat dry primary cells enclosed within a containing member consisting of a single tubular element which retains the cells in the desired relationship to one another, seals each cell from the cells adjacent thereto, provides physical protection for the battery and prevents the leakage of electrolyte or electrolytic decomposition products from the battery during or after discharge.

Another object is a cylindrical dry battery comprising a plurality of flat dry cells enclosed within a single tubular member adapted to endow the battery with those attributes of resistance to leakage which have characterized certain batteries sold by Ray-O-Vac Company under the trademark "Leak Proof."

Further objects will become apparent from the drawings and the following detailed description in which it is my intention to set forth and describe my invention and to show its applicability without limiting its scope. In the drawings and description like reference numerals refer to like parts.

Figure 1:
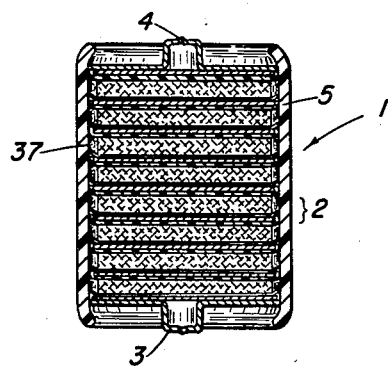
Figure 1 is a cross-sectional view of a battery according to the invention.
Figure 2:
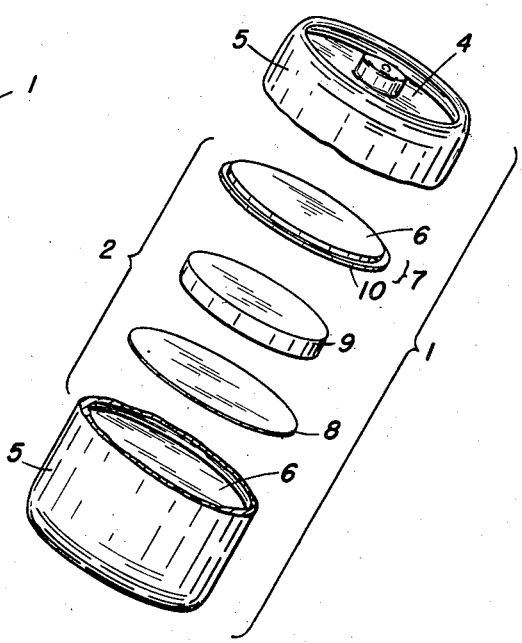
Figure 2 is a perspective view, partially cut apart and expanded, of a battery of the invention, showing elements of a cell thereof.
Figure 3:
Figure 3 is a cross-sectional view of a combination cathode-anode suitable for the invention.

Referring now to Figures 1, 2 and 3 there is shown a battery indicated generally as 1, consisting of a plurality of cells 2, a negative end cap or terminal 3, a positive end cap or terminal 4, and tubular member 5 which preferably consists of polymethylmethacrylate or a synthetic resin comprising essentially entirely polymethylmethacrylate but may be any other thermoplastic rigid synthetic resinous polymeric material wherein monomeric molecules are linked by bonds made available by the opening of a bond in an ethylenic unsaturation in each monomer molecule, i. e., such material polymerized from monomers containing one ethylenic unsaturation in each monomeric molecule, known generally as vinyl polymers or ethylenic polymers. Not all such materials are suitable since only those can be used which are relatively rigid at most operating temperatures, which have a relatively high tensile strength, which are characterized by a considerable plastic memory and which are resistant or can be made resistant to solvents, hydrocarbon oils, weather, water, sunlight or ultraviolet light, abrasives, shocks and impacts, and battery electrolytes, either acid or caustic. In addition to polymethylmethacrylate, synthetic polymers which may be suitable include unplasticized ("rigid") polyvinyl chloride, certain copolymers or terpolymers of styrene, butadiene, and acrylonitrile with one another or with an ester of acrylic or methacrylic acid or the like, polyethylene irradiated by electron bombardment and so forth. As epoxide resins such as those prepared by reacting a bis-phenol with epichlorohydrin become further developed, a resin of this type may be found suitable.

Each cell may comprise an anode 6 which is part of a combination cathode-anode element 7 described more fully hereinbelow, a disc 8 of bibulous electrolyte-absorbent material, such as Webril or paper, impregnated with electrolyte, a cathodic depolarizer cake 9, and a cathode or positive electrode 10 which is also part of a combination cathode-anode element 7. A separator not shown may be necessary if caustic electrolyte is utilized. Each of elements 7 may be prepared by joining together a cathode and an anode by means of adhesive or heat sealing. In a Leclanche cell the anode may be a zinc disc and the cathode may be a disc, slightly larger in diameter, of conductive material inert to the electrolyte. Such material may be provided by incorporating graphite or carbon black or both into a suitable thermoplastic synthetic resin such as a polymer or copolymer of vinyl chloride, vinyl acetate, vinylidene chloride, ethyl, propyl, and butyl acrylate or methacrylate, styrene, ethylene, tetrafluoroethylene, chlorotrifluoroethylene, and the like.

A cathode and anode as thus described may suitably be joined to provide element 7 as shown by pressing together between heated platens whereby heat sealing of the cathode to the anode is accomplished. The combination element may also be provided by molding or casting element 10 in place in contact with element 6. They may also be joined to provide a combination cathode-anode by coating either the cathode or anode with a suitable adhesive, pressing together and maintaining the pressure, which may be no more than that provided by the weight of the cathode or anode in some cases, until the adhesive has set by drying or by polymerization. Suitable adhesives, which must of course be inert to the electrolyte, may be prepared from formulations comparable to those described as suitable for conductive cathodic material. A suitable adhesive may also be an epoxide resin catalyzed with an amine or other suitable catalyst or may be a natural or synthetic rubber dissolved in a suitable solvent or solvent mixture or may be a polymer or copolymer of vinyl chloride, vinyl acetate, styrene, butadiene, methacrylic acid, methacrylate ester, acrylic acid, acrylate ester or other unsaturated monomer dissolved in a suitable solvent or solvent mixture. Such compositions are for the most part inert to both weak acids and bases such as those which characterize acid and caustic electrolytes respectively in dry cells.

In a Leclanche cell the cathodic depolarizer cake may comprise carbon black, graphite and manganese oxide whereas in a cell containing a caustic electrolyte it may comprise any well known depolarizing compound which is suitable for the electrolytic system being employed, an example being HgO.

In certain caustic cells it is desirable to provide both cathodic and anodic materials as cakes of particles, in some cases somewhat adherent to one another, or in the form of an amalgam of weak physical strength. Such materials are in some cases pressed into cuplike receptacles and the present invention encompasses the provision of a block or cupful of anodic material joined in place of element 6 to cathode 10 to provide an element comparable in function to the combination element 7 and also encompasses the provision of a block or cupful of cathodic depolarizing material in place of or in addition to mix cake 9, joined to element 10 on the opposite side thereof from element 6 or an element serving the function thereof, the joining being accomplished by means previously described.

Figure 4:
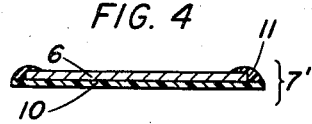
Figure 4 is a cross-sectional view of another embodiment of a combination cathode-anode.

As shown in Figure 4, an alternative and preferred form of combination cathode-anode 7' may be provided by covering the juncture of elements 6 and 10 with a bead of conductive synthetic resin 11, inert to electrolyte, conductivity being provided by addition to a suitable synthetic resin of graphite or carbon black or both or any other material of cathodic nature and inert to electrolyte, adapted to provide conductivity. The formulation of the material of bead 11 is preferably similar or identical to that of cathode 10. The beading may be accomplished by casting, spraying or brushing a solution of the conductive resin composition around the periphery of element 6 after first joining elements 6 and 10 together as hereinbefore described, and then evaporating the solvent therefrom. The use of elements 7' in place of elements 7 tends to reduce the number of defective seals obtained between elements 6 and the interior of tube 5.

Figure 5:
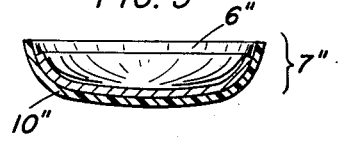
Figure 5 is a cross-sectional view of still another embodiment of a combination cathode-anode.

Referring now to Figure 5, there is shown another embodiment 7" of a combination cathode-anode, wherein both the cathode 10" and the anode 6" are dished or cupped in form. The dishing or cupping may be accomplished either before or after joining together elements 6" and 10". The use of a dished or cupped element 7" in place of element 7 may require the use of somewhat dished or cupped depolarizer cakes in place of elements 9.

Figure 6:
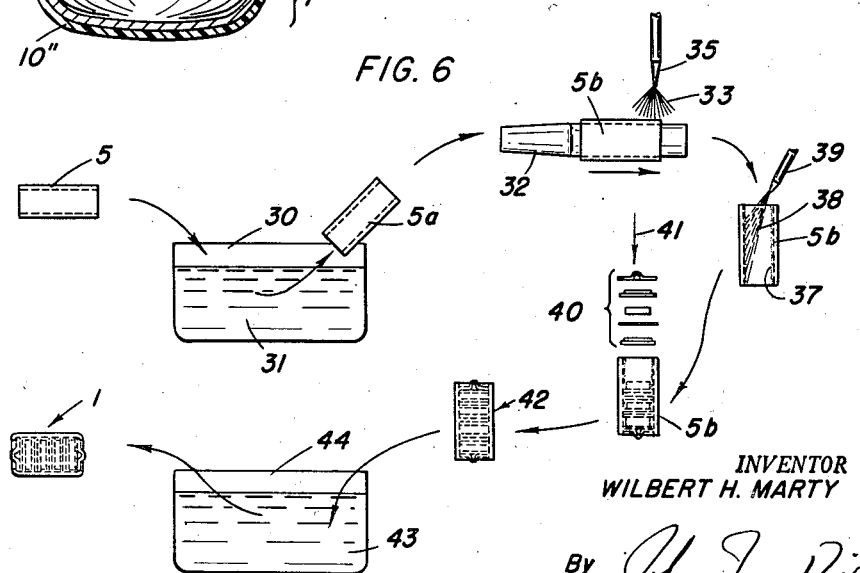
Figure 6 is a diagrammatic illustration of the process of making the battery of the invention.

Referring now to Figure 6, there is shown a process for making battery 1. Tube 5 first may be immersed in a bath 30 of hot liquid 31 or heated in an oven or by any other means to provide heated tube 5a. If tube 5 comprises essentially entirely polymethyl methacrylate the tube may be heated to a temperature of 180° F. to 340° F. Heated tube 5a may be then forced over mandrel 32 to provide heated and expanded tube 5b which may then be cooled by any suitable means such as by maintenance for a suitable period of time in the interior of a refrigerator (not shown) or by directing a blast 33 of cool air from nozzle 35 against the outside of tube 5b. The mandrel may suitable provide an increase in diameter of from 2% to 30% although an increase of 5% to 20% is usually most satisfactory. The interior of expanded tube 5b may be then coated with adhesive 37 by directing a spray 38 of adhesive from nozzle 39 against the interior, by brushing, by dipping, by temporarily closing or covering one end of the tube and filling the tube with adhesive component and then emptying the excess, by brushing or by any other suitable means.

The adhesive may be comparable in chemical nature to either the composition of tube 5 or of element 10 or both but need not be comparable to either. It may be either thermoplastic or thermosetting or both. It must provide a good bond to both the material of tube 5 and the material of element 7 in the presence of electrolye and of course must be inert to electrolyte. The adhesive formulation 37 may be a solvent solution which may then be dried before carrying out the next step. It may be a viscous prepolymeric or monomeric material adapted to cure and provide a firm bond when treated in a subsequent step in the process. An adhesive composition identical to that used in joining elements 6 and 10 may be used. A suitable adhesive may be a resinous polymeric material partially thermoplastic in nature so that in the next step it becomes markedly reduced in viscosity when first heated and thus flows readily to fill interstices between the interior of tube 5c and the outer edges of elements 10 and which upon further heating irreversibly polymerizes with cross-linking, that is, behaves like a thermosetting resin, to provide a seal which is relatively unaffected by high operating temperatures when in service. Such an adhesive may be prepared utilizing the condensation products of bis-phenol and epichlorohydrin under strongly acid or basic conditions, known as epoxide resins, which may be polymerized with amines or polycarboxylic acid catalysts. Resins containing polymers or copolymers of vinyl chloride, vinyl acetate, vinylidene chloride and/or methacrylic and/or acrylic acid and esters of these acids may suitably be used.

The elements 7, 7' or 7", 8, 9, 3 and 4 indicated generally as 40 may then be inserted in tube 25 by exerting pressure in the direction indicated by arrow 41 to provide the assembly indicated generally as 42, wherein the outer edges of elements 10 are bent upwardly. Assembly 42 is then heated by immersion in hot liquid 43 contained in bath 44 or preferably by heating in an oven (not shown) whereby tube 5c shrinks as a result of plastic memory until further shrinkage is prevented by the elements disposed therewithin. The heat and shrinkage jointly provide the sealing of the upwardly bent outer edges of elements 10 to the interior of tube 25 by means of heat and pressure. Thus the completed battery 1 may be made.

The invention is further illustrated by the following examples:

*Example 1*

A battery was made with elements as shown in Figures 1, 2, 4 and 6, containing 6 cells. Tube 5 was polymethylmethacrylate which has an initial I. D. of .500" and O. D. of ⅝" and was expanded to an I. D. of .580" and subsequently caused to shrink to a diameter determined by the sizes of the several elements contained therein. End caps 3 and 4 were omitted. Elements 10 were .050" thick and the composition of elements 10 and beads 11 was:

70 parts copolymer of 87% vinylchloride and 13% vinyl acetate
50 parts diisobutyl ketone
100 parts methyl ethyl ketone
30 parts carbon black The composition of adhesive 12 used to adhere together elements 6 and 10, and also of adhesive 37 was:

1 part copolymer of 87% vinyl chloride and 13% vinyl acetate
3 parts methyl ethyl ketone Elements 6 were zinc discs .007" thick and .550" in diameter. Elements 8 were discs of filter paper ¾ inch in diameter. The electrolyte and mix cake were taken from a flashlight battery dry cell and comprised ammonium chloride, HCl, $MnO_2$, graphite and carbon black. The battery had the following open circuit voltages:

Initial _____ 8.4
28 days _____ 8.0
33 days _____ 8.0

*Example 2*

A battery comparable in all respects to that of Example 1 was made with the exception that bead 11 was not included, and it was thus made in accordance with Figures 1, 2, 3 and 6. Open circuit voltages of two such batteries were as follows:

Initial _____ 8.0
29 days _____ 6.5
34 days _____ 5.5

*Example 3*

Another battery substantially identical to that of Example 2 had the following open circuit voltages:

Initial _____ 8.0
29 days _____ 7.4
34 days _____ 8.0

*Example 4*

A battery similar to that of Example 2 was made utilizing cupped elements such as illustrated in Figure 5. A solution of solid polymerized terpene resin dissolved in acetone was used for adhesive 37 and was applied by dipping. The battery had an initial open circuit voltage of 7.5 volts.

*Example 5*

Another battery similar to that of Example 1 was made utilizing elements 10 having a slightly larger diameter. Adhesive 37 was identical with that used in Example 4. This battery had an initial open circuit voltage of 7.0 volts.

Batteries comparable in every respect to that of Example 2 were made utilizing respectively as materials for tube 5, a .500-inch diameter tubing of polyvinylidene chloride copolymer sold commercially under the trademark "Tygon" by U. S. Stoneware Company, polystyrene tubing, polyethylene tubing and tubing consisting of a copolymer of vinyl chloride and vinylidene chloride sold commercially under the trademark "Saran" by National Plastic Products Company.

*Example 6*

Another battery substantially identical to that of Example 2 had the following open circuit voltages:

Initial _____ 8.0
32 days _____ 7.5
37 days _____ 7.5

*Example 7*

A battery comparable to that of Example 2, containing elements 10 which were .020" thick, had the following open circuit voltages:

Initial _____ 8.0
33 days _____ 7.5
38 days _____ 7.5

Conductive resinous compositions which are inert to most electrolytes and suitable for use in elements 10 have been made by thoroughly mixing from about 15% to about 40% of graphite and carbon black with polymethylmethacrylate, with polystyrene, with polyethylene, with polytrifluorochloroethylene, and with alcohol-soluble polyamide.

Adhesive formulations which may satisfactorily be used for adhesive 37 or adhesive 12 include:

(a) Parts
Epoxy resin (Shell's Epon 862) _____ 80
Triethylene tetramine _____ 10
Diatomaceous earth _____ 10

(b)
"Aroclor" resin (chlorinated diphenyl, 45–50% $Cl_2$) _____ 40
Methyl ethyl ketone _____ 50
Diisobutyl ketone _____ 10

(c)
Vinyl terpolymer (86% vinyl chloride) (13% vinyl acetate) (1% maleic anhydride) _____ 20
Methyl isobutyl ketone _____ 40
Toluol _____ 40

(d)
Phenol-formaldehyde resin, B stage _____ 20
Butadiene-acrylonitrile elastomer _____ 20
Methyl ethyl ketone _____ 60

Having thus disclosed my invention, I claim:

1. A flat dry-cell battery comprising a plurality of cells, each of which comprises a flat negative metal electrode disc, a positive electrode disc having its outer marginal edges turned upwardly, a liquid electrolyte disposed between and in contact with said electrodes, end caps and a single insulating, sealing, containing and strengthening tubular member of plastic having elastic memory, characterized by said positive electrode consisting of synthetic polymeric resinous electrically conductive material inert to chemical degradation by said electrolyte and by said negative electrode being sealed to a positive electrode and by said positive electrode being sealed to a negative electrode and further characterized by an adherent bond between the outer upturned edges of said positive electrode discs and the adjacent interior surface of said tubular member.

2. The battery of claim 1 characterized by said tubular member consisting essentially of polymethyl methacrylate.

3. The battery of claim 1 characterized by said tubular member consisting essentially of unplasticized polyvinyl chloride.

4. A flat dry-cell battery comprising a plurality of cells, each of which comprises a flat negative metal electrode disc, a positive electrode disc larger in diameter than said metal electrode disc and having its outer marginal edges turned upwardly, a liquid electrolyte disposed between and in contact with said electrodes, end caps and a single insulating, sealing containing and strengthening tubular member of plastic having elastic memory, characterized by said positive electrode consisting of synthetic polymeric resinous electrically conductive material inert to chemical degradation by said electrolyte and by said negative electrode being sealed to a positive electrode and by said positive electrode being sealed to a negative electrode and further characterized by an adherent bond between the outer upturned edges of said positive electrode discs and the adjacent interior surface of said tubular member.

5. A flat dry-cell battery comprising a plurality of cells, each of which comprises a flat negative zinc electrode disc, a positive electrode disc having its outer marginal edges turned upwardly, a liquid acid electrolyte disposed between and in contact with said electrodes, end caps and a single insulating, sealing, containing and strengthening tubular member of plastic having elastic memory, characterized by said positive electrode consisting of synthetic polymeric resinous electrically conductive material inert to chemical degradation by said acid electrolyte and by said negative electrode being sealed to a positive electrode and by said positive electrode being sealed to a negative electrode and further characterized by an adhesive bond between the outer upturned edges of said positive electrode discs and the adjacent interior surface of said tubular member.

6. The battery of claim 5 characterized by said tubular member consisting essentially of polymethyl methacrylate.

7. The battery of claim 5 characterized by said tubular member consisting essentially of unplasticized polyvinyl chloride.

8. A flat dry-cell battery comprising a plurality of cells, each of which comprises a flat negative zinc electrode disc, a positive electrode disc larger in diameter than said zinc electrode disc and having its outer marginal edges turned upwardly, a liquid acid electrolyte disposed between and in contact with said electrodes, end caps and a single insulating sealing containing and strengthening tubular member of plastic having elastic memory, characterized by said positive electrode consisting of synthetic polymeric resinous electrically conductive material inert to chemical degradation by said acid electrolyte and by said negative electrode being sealed to a positive electrode and by said positive electrode being sealed to a negative electrode and further characterized by an adhesive bond between the outer upturned edges of said positive electrode discs and the adjacent interior surface of said tubular member.

9. The method of making the battery of claim 1 comprising the steps of heating a tube comprising essentially thermoplastic synthetic resin having elastic memory to a temperature above 100° C. and while maintaining said temperature, forcing it over a mandrel to increase its diameter, cooling said tube while said increased diameter is maintained, coating the inside surface of said tube with adhesive, inserting thereinto an end cap and then inserting thereinto repetitively a combination electrode element, a bibulous separator, a liquid electrolyte, depolarizer mix, and then inserting another end cap, then heating said assembly and thereby causing said tubular member to shrink by reason of said elastic memory and substantially in the absence of solvent around said elements inserted therein and to bend up the edges of said discs of resinous material and to adhesively bond to said edges, and then cooling said assembly.

10. The method of making the battery of claim 1 comprising the steps of heating a tube comprising essentially thermoplastic synthetic resin having elastic memory to a temperature above 100° C. and while maintaining said temperature, forcing it over a mandrel to increase its diameter, cooling said tube while said increased diameter is maintained, coating the inside surface of said tube with adhesive, inserting thereinto an end cap and then inserting thereinto repetitively a combination element each comprising a metal disc and a slightly larger disc of electrically conductive synthetic resinous material adherently attached together, a bibulous separator, a liquid electrolyte, depolarizer mix, and then inserting another end cap, then heating said assembly and thereby causing said tubular member to shrink by reason of said elastic memory and substantially in the absence of solvent around said elements inserted therein and to bend up the edges of said discs of resinous material and to adhesively bond to said edges, and then cooling said asesmbly.

References Cited in the file of this patent

UNITED STATES PATENTS

| Re. 22,065 | Young | Apr. 7, 1942 |
| 2,519,052 | Krachenfels | Aug. 15, 1950 |
| 2,650,946 | Winckler | Sept. 1, 1953 |
| 2,671,125 | Heraud | Mar. 2, 1954 |
| 2,672,498 | Temple | Mar. 16, 1954 |

FOREIGN PATENTS

| 902,205 | France | Feb. 25, 1944 |
| 617,001 | Great Britain | Jan. 31, 1949 |